SMITH & KNIGHT.
Car Brake and Starter.
No. 77,223.
Patented April 28, 1868.
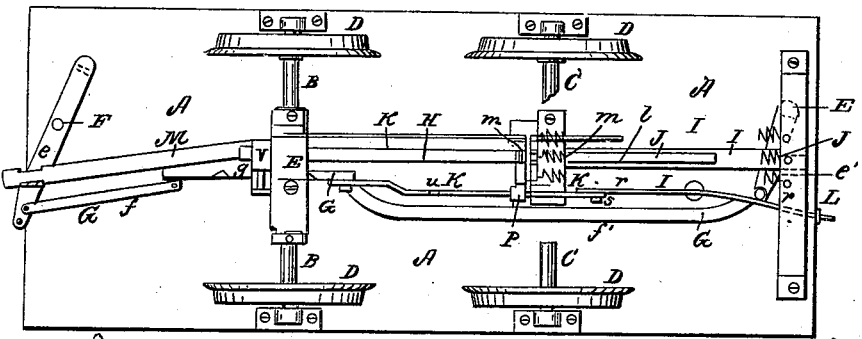
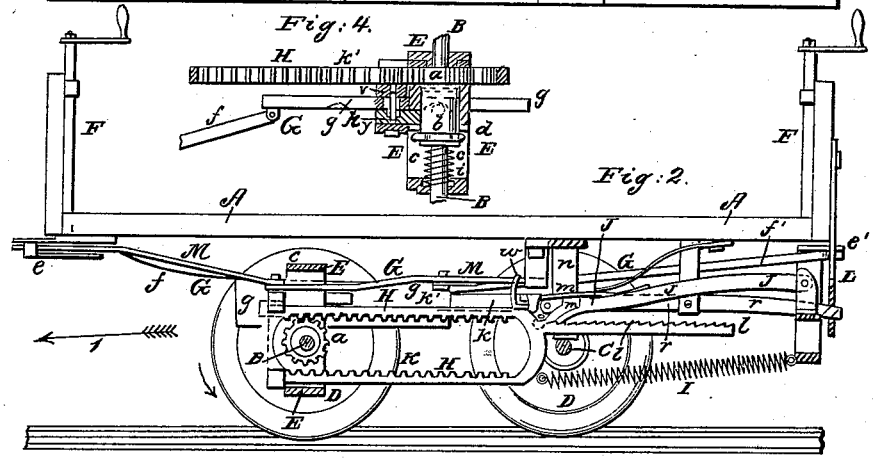
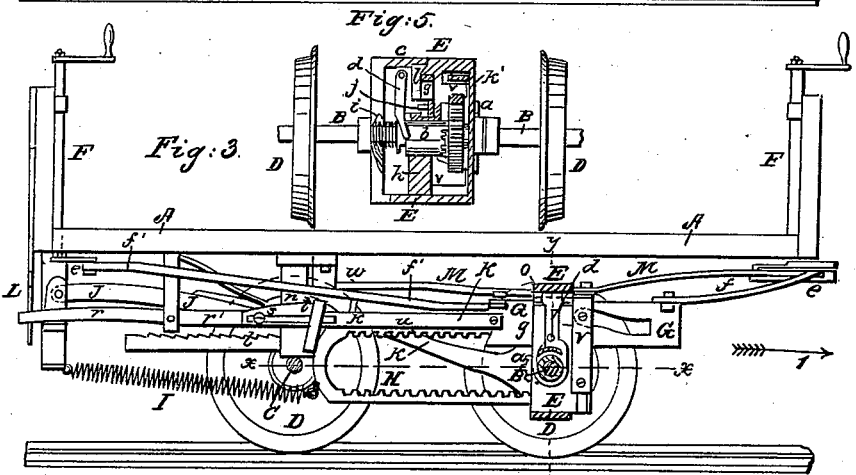
Witnesses:
Theo Tusche.
Wm Trewin.
Inventors:
L. J. Smith
D. S. Knight
Per Munn & Co.
Attorneys.

United States Patent Office.

L. J. SMITH, OF HAMILTON, OHIO, AND D. S. KNIGHT, OF NEW YORK, N. Y.

Letters Patent No. 77,223, dated April 28, 1868.

IMPROVED CAR-BRAKE AND STARTER.

*The Schedule referred to in these Letters Patent and making part of the same.*

TO ALL WHOM IT MAY CONCERN:

Be it known that we, L. J. SMITH, of Hamilton, in the county of Butler, and State of Ohio, and D. S. KNIGHT, of the city, county, and State of New York, have invented a new and improved Railroad-Car Brake and Starter; and we do hereby declare that the following is a full, clear, and exact description thereof, which will enable those skilled in the art to make and use the same, reference being had to the accompanying drawings, forming part of this specification, in which—

Figure 1 represents an inverted plan view of our invention.

Figure 2 is a side elevation, partly in section, of the same.

Figure 3 is an elevation of the opposite side of the same.

Figure 4 is an inverted horizontal sectional view of the same, the plane of section being indicated by the line $x\ x$, fig. 3.

Figure 5 is a vertical transverse sectional view of the same, the plane of section being indicated by the line $y\ y$, fig. 3.

Similar letters of reference indicate corresponding parts.

This invention relates to a combined railroad-car brake and starter, the device being so arranged that when the brake is applied, the starter will be wound up, so that when the brake is again released, the car to which the device is applied will receive a start, thus overcoming the inertia of the car, whether the same is at rest or in motion.

The invention consists in hanging a pinion loosely on one of the axles of a railroad-car, and in providing a clutch, by means of which said pinion can be connected with the axle, so as to turn with the same, whenever desired.

An endless rack is fitted around the pinion, and one of its sides can, at will, be thrown into gear with the pinion. The endless rack is arranged so that it can slide under the car, and when the pinion is in gear with the axle it is also in gear with the rack, moving the same, and thereby winding up the spring or weight for the starting-device.

When the spring or weight is wound up the rack is locked, and prevents the pinion from turning, and consequently also the axle, when the same is in gear with the pinion. Thus an efficient brake is provided.

When the car is at rest, the rack can be released by means of a lever, arranged upon the platform of the car, when the weight or spring will draw the rack back, revolving the pinion, and, with the same, the car-axle, thus starting the car.

Provision is made that the car will be started in the desired direction, by bringing either the upper or the lower toothed edge of the rack into contact with the pinion.

Provision is also made that the car cannot be stopped by the winding up of the weights or springs, unless desired.

A represents the platform of a railroad-car.

B and C are the axles hung in suitable boxes, and carrying the wheels D D, as usual.

Upon the axle B is hung a loose pinion, $a$, as shown in fig. 5.

$b$ is a clutch sliding on the axle, and connected by a tongue or otherwise with the same, so as to revolve with it.

E is a rectangular frame, through the two vertical sides of which the axle B passes.

To the upper horizontal bar, $c$, of the frame E, is pivoted a lever, $d$, which is connected with the clutch, and which, when moved by a suitable apparatus, is used to connect or disconnect the clutch and pinion.

In each end of the car is arranged a vertical shaft, F, which carries a horizontal crank, $e$ and $e'$, below the platforms, as shown in fig. 1.

The ends of the two cranks, $e$ and $e'$, are connected with each other by a pointed bar, G, which consists of three pieces, $f, f'$, and $g$.

The pieces $f$ and $f'$ are respectively secured to the cranks $e$ and $e'$, while the piece $g$ is pivoted to the inner ends of the pieces $f$ and $f'$.

The piece $g$ is a plate set on edge and slotted, as shown in figs. 2 and 3. It fits through a slot in a vertical bar, $h$, which is formed in and is part of the frame E. The sides of the plate $g$ are not straight, but are provided with two notches or recesses, as shown in fig. 1.

A spring, $i$, on the axle B, tends to push the clutch $b$ against the pinion $a$, so as to throw the latter in gear with the axle.

To the side of the small lever $d$ is fixed a stud, carrying a small roller, $j$, which is, by the action of the spring $i$, pressed against the side of the plate $g$, as shown in fig. 5.

When one of the shafts F is turned so as to bring the thick part of the plate $g$ against the roller $j$, as in fig. 1, the clutch will be forced back off the pinion, and the latter will then turn loose on the axle. In this position the cranks $e\ e'$ will be quite or nearly parallel with the axle of the car.

When the shafts F are turned so as to bring the end of one of the cranks as far forward or backward as possible, one of the notches of the plate $g$ will be opposite the wheel $j$, and the clutch will then be able to reach to the pinion, bringing the same into gear with the clutch, as indicated in fig. 4, in which the roller $j$ is indicated by dotted lines above the clutch.

From the foregoing it will be understood that by turning one of the shafts F, the pinion can, at will, be thrown in or out of gear with the axle, around which it is secured.

$k\ k'$ are two ratchet-bars, connected at their ends to form a frame, H, in which the bars $k\ k'$ are parallel with each other, their teeth being on their inner edges.

The distance between the bars $k$ and $k'$ is greater than the diameter of the pinion $a$, so that when the frame H is placed around the pinion, only one of its toothed sides can be in gear with the pinion.

One end of the frame H is connected with a series of springs, I, or with one suitable spring or weight, which have the tendency to draw the frame H towards them.

To the same end of the frame H to which the springs are secured, is also secured a straight notched bar, $l$, as shown in figs. 2 and 3.

J is a spring-pawl, secured to the under side of the car-platforms, or to a frame or support, secured to the same. The end of the pawl J fits into the teeth of the notched bar $l$, thereby preventing the ratchet-frame H from moving toward the springs.

$m$ is a cam secured to a horizontal pin, which has its bearings in a stud, $n$, projecting from the under side of the car-platform. This cam fits under an arm, $o$, fig. 2, projecting from the spring-pawl J, and when it is turned up, it will raise the pawl off the notched bar $l$.

On the pin to which the cam is secured, is also secured a rectangular slotted plate, $p$, through which a bar, K, passes.

The bar K is pivoted with one end to the plate $g$, and with the other it is connected to a bar, $r$, which is pivoted to a vertical stud, projecting from the under side of the car-platform.

A pin, $s$, on the inner end of the bar $r$ fits through a slot in the end of the bar K, and thus parts K and $r$ are connected.

On each edge of the plate K is formed a projecting stud. The stud $t$ being on the upper, and $u$ on the lower edge.

The outer end of the bar $r$ is held in a slot or hole formed in a spring-plate, L, and as there are two slots or holes formed in the plate L, one above the other, the outer end of the bar $r$ can be secured higher or lower.

If it is secured in the lower hole, as in figs. 2 and 3, the outer end of the plate K is raised, while, when the outer end of $r$ is raised, that of K is depressed.

Thereby it is effected that either the lug $t$ or $u$ comes in contact with one end of the plate $p$, and that therefore the cam $m$ is operated upon, either during the forward or backward motion of the plate $g$.

The operation of the apparatus is as follows:

When the car is in motion, the pinion is out of gear and turns loose on the axle.

When the brake is to be applied, the front shaft, F, is turned so as to draw the plate $g$ through the bar $h$, to bring the roller $j$ into the recess of the plate $g$, and thereby to connect the pinion with the clutch. The pinion will then revolve with the axle.

If the car moves in the direction of the arrow 1 in figs. 2 and 3, so that the axle B is in front, and so that the wheels are revolved in the direction indicated in fig. 2, it will be necessary that the upper bar $k'$ of the ratchet-frame H be in gear with the pinion.

The frame H is clamped between two jaws of a slide, V, which is formed on the frame E, and which carries a roller fitting through the slot in the plate $g$.

As the slot in the plate $g$ is higher at the rear end than at the front end, as shown in fig. 3, it is evident that if the upper ratchet-bar of the frame H is to be brought in gear with the pinion $a$, the bar $g$ is to be pushed back, so as to bring the roller on the slide V into the lower portion of its slot, thereby lowering the frame H, making it rest upon the pinion.

When thus the car is moving forward in the direction of the arrow 1, the brake can be applied by turning the shaft F, so as to move the plate $g$ towards the rear end. Thereby the pinion will be thrown in gear with the axle and with the upper bar $k'$ of the frame H.

As the pinion revolves with the axle, the rack is moved forward, slipping under the pawl J, and stretching the springs I, or winding up their equivalent weights or springs.

When the frame H is moved as far forward as it can be, it will lock the pinion, as it cannot move backward nor forward any further. Then, as the pinion is in gear with the axle B, will the axle B also be prevented from turning, and the brake is applied.

To prevent the sudden arrest of all motion when the rack-frame is moved forward, and the consequent shock-breakage, a device has been provided, by means of which the car will continue to move, even when the rack-frame is forward.

This device consists of a pin, $w$, projecting from the upper edge of the frame H, and fitting through a slot in a bar, M, which is connected at its front end with the crank, $e$, while its rear end is loose.

When the rack is as far forward as it can be, the pin $w$ strikes the forward end of the slot in the bar M, pushing it forward, and bringing the crank, $e$, into an about parallel position with the axles B C. Thereby the rod G will be pulled with that, the plate $g$, and the latter will, by this motion, throw back the clutch $b$, releasing the pinion and allowing the axle to revolve loose in the pinion, so the car can go ahead, but the rack remains wound up, being held in place.

Whenever it is desired to stop the car, after the pinion has been thus released, the brake can be easily applied by a simple turn of one of the shafts, F, whereby the pinion will be locked to the axle again.

When the car is at rest, and is to be started, one of the shafts, F, must be turned to draw the bar K, whereby one of the stops on the latter will strike against the plate $p$, raising the cam $m$, and thereby the pawl J, thus releasing the rack-frame, which will then be drawn back by the springs or their equivalents.

The rack, when it is to start the machine, must be shifted vertically so as to revolve the pinion in the same direction during its backward as during its forward move. Therefore when the car is to be started in the direction of the arrow 1, the lower bar of the rack must be brought in gear with the pinion. This is done by drawing the plate $g$ forward, whereby the rack-frame will be raised, bringing its lower bar, $k$, against the pinion. When, then, the frame H is drawn back, it will revolve the pinion $a$ and axle B in the direction necessary to propel the car in the required direction.

As the bar $g$ is to be drawn forward to start the car, it is evident that the rear stop, on bar K, must work on the plate $p$. The rear stop is the stop $t$, on the upper edge of the plate K.

To make the upper stop, $t$, work against the plate $p$, it is necessary that the end of the lever $r$ be in the lower hole or stop of the spring-plate L. Thus, when the car moves forward in the direction of the arrow 1, the outer end of the bar $r$ must be depressed, while it must be raised to bring the stop $u$ into operation when the car is to move in the opposite direction.

When the rack-frame, H, is quite drawn back by the springs, the pinion will be prevented from further revolution in the required direction. Thereby the car would be stopped, to prevent which the bar M is arranged.

When the frame H is almost quite drawn back, its pin, $w$, strikes against the rear end of the slot in the bar M, and thereby draws the crank $e$ in, so as to move the plate $g$ backwards, throwing the pinion out of gear and allowing the axle to revolve loose in it.

From the foregoing description it will be easily understood that the car can be stopped at will when moving in either direction, and that it can also be started so as to move in the desired direction.

We claim as new, and desire to secure by Letters Patent—

1. The slotted and notched or recessed plate $g$, when arranged substantially as herein shown and described, for the purpose of throwing the pinion $a$ in or out of gear, and also for raising and lowering the rack-frame H, substantially as and for the purpose herein shown and described.

2. The plate $g$, when connected with or part of the sliding bar G, in combination with the pawl $d$, carrying a friction-roller, $j$, and with the clutch $b$ and spring $i$, all made and operating substantially as herein shown and described.

3. The slotted sliding plate $g$, when arranged as described, in combination with the slide $r$, fixed frame E, and rack-frame H, all made and operating substantially as herein shown and described.

4. The sliding rack-frame H, in combination with the pinion $a$, and with the notched bar $l$ and spring-pawl J, all made and operating substantially as herein shown and described.

5. The device for throwing the spring-pawl J off the bar $l$, consisting of the cam $m$, slotted plate $p$, and sliding bar K, having two studs, $t$ and $u$, all made and operating substantially as and for the purpose herein shown and described.

6. The bar K, carrying the studs $t$ and $u$, when hinged to the end of the bar $g$, and when connected with the adjustable swinging bar $r$, all made and operating substantially as herein shown and described.

7. The rack-frame H, when provided with the pin or stud $w$, in combination with the sliding bar M and crank $e$, all made substantially as described, and operating so as to automatically throw the clutch off the pinion $a$, when the rack-frame is at either extremity of position.

8. The rack-frame H, when provided with a notched bar, $l$, and when fitted around the pinion $a$ and axle B, in combination with the springs I, or their equivalents, all made and operating substantially as herein shown and described.

9. A combined railroad-car brake and starting-apparatus, made and operating substantially as described, and connected with vertical shafts, F F, at the ends of the car, so as to be under complete control of the brakeman, as set forth.

L. J. SMITH,
D. S. KNIGHT.

Witnesses for KNIGHT:
  WM. F. MCNAMARA,
  ALEX. F. ROBERTS.
Witnesses for SMITH:
  F. EZRY,
  ISRAEL WILLIAMS.